United States Patent [19]
Dilling et al.

[11] Patent Number: 5,989,299
[45] Date of Patent: Nov. 23, 1999

[54] MIXTURES OF AMINE MODIFIED LIGNIN WITH SULFONATED LIGNIN FOR DISPERSE DYE

[75] Inventors: Peter Dilling; Gamini S. Samaranayake, both of Mt. Pleasant, S.C.

[73] Assignee: Westvaco Corporation, New York, N.Y.

[21] Appl. No.: 09/084,823

[22] Filed: May 26, 1998

[51] Int. Cl.⁶ .................................................. D06P 1/50

[52] U.S. Cl. ......................... 8/554; 8/557; 8/905; 8/912; 8/662

[58] Field of Search ................................ 8/524, 557, 554, 8/552, 905, 912, 913, 662

[56] References Cited

U.S. PATENT DOCUMENTS 2,709,696  5/1955  Weist et al. .
2,863,780  12/1958  Ball, Jr. .
4,732,572  3/1988  Dilling .

*Primary Examiner*—Margaret Einsmann
*Attorney, Agent, or Firm*—Terry B. McDaniel; Daniel B. Reece, IV; Richard L. Schmalz

[57] ABSTRACT

Dyestuff compositions are provided which incorporate, as the grinding aid and/or dispersant therefor, amine modified lignin admixed with sulfonated lignin. The disclosed dyestuff compositions exhibit improved heat stability and, as a result of the higher activity of the dispersant mixture of amine modified lignin blended with sulfonated lignin, less dispersant is present in the exhaust liquor and waste treatment demands are thereby reduced. The improved package dyeing grinding aid/dispersant of the invention is prepared by mixing an amine modified lignin with a sulfonated lignin.

10 Claims, No Drawings

MIXTURES OF AMINE MODIFIED LIGNIN WITH SULFONATED LIGNIN FOR DISPERSE DYE

BACKGROUND OF THE INVENTION

1. Field of the Invention

This invention relates to disperse dye compositions incorporating amine modified lignin. More particularly, this invention relates to dispersed dye compositions prepared with amine modified lignin mixed with sulfonated lignin (lignosulfonate) as a dispersant or as a grinding aid. Most particularly, this invention is related to dispersed dye compositions of improved heat stability for use primarily in package dyeing.

2. Description of Related Art (Including Information Disclosed Under 37 CFR 1.97 and 37 CFR 1.98)

Dyestuff compositions generally comprise a dye cake, itself comprising a dye and a dispersant and/or diluent. These dyestuff compositions are widely used to color both natural and synthetic fibers. In the dyestuff composition, the dispersant serves three basic functions: (1) it assists in reducing the dye particle to a fine size; (2) it maintains a dispersing medium; and (3) it is used as a diluent.

Dye dispersants are generally one of two major types: (1) sulfonated lignins from the wood pulping industry (via either the sulfite pulping process or the kraft pulping process) where lignocellulosic materials, such as wood, straw, corn stalks, bagasse, and the like, are processed to separate the cellulose or pulp from the lignin or (2) naphthalene sulfonates from the petroleum industry. The present invention relates to improvements of sulfonated lignin dye dispersants. More particularly, the instant invention relates to amine modified lignin as a dye dispersant enhancer with disperse dyes. Disperse dye compositions employing sulfonated lignins as dispersants are well known.

Sulfite (or bisulfite) wood pulping process lignin is recovered from the spent pulping liquor, known as "black liquor," as lignosulfonates; whereas, kraft (or sulfate) wood pulping process lignin is recovered from the black liquor as the sodium salt of lignin (products marketed under the Indulin® mark by Westvaco Corporation). This recovered sulfate lignin is subjected to sulfonation or sulfomethylation for use as dye dispersants, such as products marketed under the Polyfon®, Kraftsperse®, and Reax® marks by Westvaco Corporation. As used herein, the term "sulfonated lignins" may be used generally to refer to lignosulfonates, sulfonated lignins, or sulfomethylated lignins as before described.

The advantages of employing sulfonated lignins as dispersants in dyestuff compositions are (1) availability and (2) unique physical properties, which include good compatibility to many dye systems and outstanding dispersant characteristics at ambient and elevated temperatures. There are, however, a number of disadvantages in employing lignins as dispersants, whether they are sulfite lignosulfonates or kraft-derived sulfonated lignins. These negative factors include fiber staining (as lignin in dry powder form is brown in color) and heat stability (as the dyeing process is conducted at elevated temperatures) of the lignins employed. These adverse properties are troublesome to dyers and many attempts have been made to overcome these disadvantages.

A number of technological developments have resulted in new methods and processes to modify sulfonated lignins to reduce the negative aspects of employing such materials as dye dispersants without simultaneously causing any major adverse effects upon those properties which render sulfonated lignins desirable as dyestuff dispersants. U.S. Pat. No. 4,001,202 describes a process for preparing a sulfonated lignin with improved fiber staining properties useful as a dye dispersant by reacting lignin with an epihalohydrin. Also, U.S. Pat. No. 4,338,091 teaches reacting a modified lignin with sodium sulfite and an aldehyde; the lignin having been modified by a pretreatment with sodium dithionate.

Additional examples of reacting or modifying lignins to make them more suitable as dye dispersants include U.S. Pat. Nos. 4,184,845, 4,131,564, 3,156,520, 3,094,515, 3,726,850, 2,680,113, and 3,769,272. The art cited is meant to show the state of the art and is not intended to be all inclusive of lignin modifications.

During the dyeing process, only the dye exhausts itself onto the fiber where it becomes an intimate part of the fiber. The lignin and other dyeing adjuvants, which are left in the exhaust liquor, need to be subsequently treated in primary and secondary waste treatment facilities. Although lignin is a natural material, lignosulfonates are considered relatively poorly biodegradable (albeit more biodegradable than synthetic dispersants from the petroleum industry), and they are often viewed as environmentally unfriendly as they often exceed the capacity of dye houses or municipality waste water treatment facilities.

One solution to this problem would be to increase the dye dispersant activity of lignin dispersants. (The term "activity" refers to the relative amount of dispersant required to function effectively. The less dispersant required to perform, the higher its activity; whereas the more dispersant required to perform, the lower is its activity.) Such enhanced activity would permit reduced dosages required for dyeing and thereby lessen the existing waste water treatment problems.

Co-pending U.S. patent application Ser. No. 09/037,353 discloses grinding and heat stability improvements provided in disperse dye package dyeing by employing a dispersant prepared by chemically incorporating a tertiary amine group in a sulfonated lignin by reacting a secondary amine with a sulfonated or sulfomethylated lignin in the presence of formaldehyde (aminomethylation). The lignin may be a sulfate (such as kraft) lignin which has been subsequently sulfonated or sulfomethylated or a lignosulfonate from sulfite pulping.

It was recently discovered that benefits of improved activity may also be derived from employing a dispersant prepared by physically admixing an amine modified lignin with a sulfonated lignin. In particular, the use of either of such admixtures resulted in improvements in heat stability.

Therefore, it is the general object of this invention to provide lignin dispersants of improved properties to enhance their usefulness as grinding aids and dye dispersants. A particular object of this invention is to increase the activity of lignin dispersants.

Another object of this invention is to provide a process for improving the heat stability of dye formulations including lignin dispersants.

Other objects, features and advantages of this invention will be seen in the following detailed description of the invention.

SUMMARY OF THE INVENTION

The above stated objects of the invention are achieved in the provision of dyestuff compositions incorporating, as the dye dispersant, amine modified lignin mixed with a sulfonated lignin. The invention dyestuff compositions exhibit greatly improved heat stability and, as a result of the higher activity of the amine modified lignin-sulfonated lignin mixture, less dispersant is present in the exhaust liquor; therefore, plant waste treatment demands are thereby reduced. The presence of amine moieties of amine modified lignin in conjunction with sulfonate groups available in sulfonated kraft, sulfomethylated kraft, and sulfite lignin provides dispersants with package dyeing heat stabilities significantly better than employing sulfonated lignin in the absence of such amine moieties.

DESCRIPTION OF THE PREFERRED EMBODIMENT(S)

Sulfonated lignins are highly negatively charged polyelectrolytes, due to the presence of fully ionizable sulfonate groups that are pH-independent as to its ionization. During grinding of dispersed dyes, a charged dispersant can prevent the re-agglomeration of finely ground particles, and also, like-charge repulsion prevents the cohesive interaction of dispersant molecules and keeps the viscosity of the solution low, aiding grinding. On the other hand, dyeing of polyester requires low pH conditions of approximately pH 4.5, where sulfonated lignins still exist as a highly negatively charged species, which in some instances does not provide adequate protection for dye particles under high temperature and high shear conditions in package dyeing. The situation requires an enhanced surface coverage on dye particles by the dispersant.

It is envisioned that an auxiliary group consisting of an amine modified lignin (that can exist in cationic form under dyeing conditions (i.e., acidic pH)), could provide a neutralization mechanism for neighboring sulfonated lignin molecules on the dye surface, thereby increasing the surface coverage. The presence of amine groups on the lignin would not affect the negative charge at grinding pH (i.e., alkaline), because the amines exist in the uncharged form. This, would provide a single dispersant for both formulation and dyeing. Such would greatly simplify the whole dyeing process.

The inter-molecular association between the amine lignin and sulfonated lignin is visualized as follows:

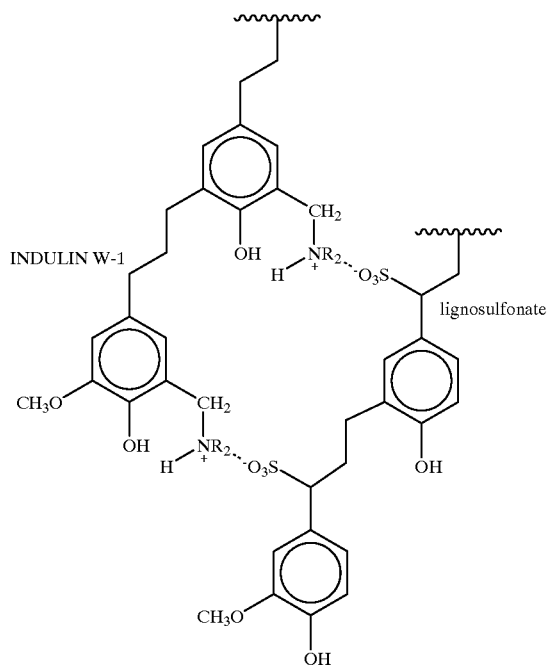

In such association, both independently charged molecules can freely move into position where ion pairing takes place.

Amines of various forms are suitable to provide a tertiary amine group on the lignin structure to form the amine modified lignin of the invention. Preferred amines are secondary amines, and among the most preferred secondary amines, based on their $pK_a$ values and flash points, are those listed in Table I.

TABLE I

| Secondary Amines | | |
|---|---|---|
| Amine | $pK_a$ | Flash point (° C.) |
| Imidazole | 6.95 | 145 |
| 2-methylimidazole | 7 | — |
| Morpholine | 8.3 | 35 |
| Sarcosine | 10 | — |
| Pyrrolidine | 10.1 | 37 |
| Dimethyiamine (40%) | 10.7 | 15 |
| Diethylamine | 11.1 | −28 |
| Dibutylamine | 11 | 41 |
| Diethanolamine | 9 | 149 |
| Diisopropanolamine | 8.5 | 12.6 |

Once secondary amines are attached to the lignin, they are unique in that they exist at alkaline pH in their tertiary form and, upon mixing the amine modified lignin with sulfonated lignin, do not interfere with the anionic character of the negatively charged sulfonate groups. As pH is lowered, the amines assume a positive charge, which can neutralize a portion of the anionic moieties in the negatively charged lignin. The reduced solubility resulting from the charge neutralization between both lignins enhances the dispersant blend's interaction with the dyestuff particle and results in a higher activity dispersant. Laboratory investigations have shown that, to achieve similar heat stability as REAX 85A (the industry standard sulfonated lignin disperse dye dispersant), amine modified lignins physically admixed with sulfonated lignins allow a greater dosage reduction in "mother paste" package dyeing heat stability.

The materials prepared were evaluated for their dispersion stabilities and package dyeing heat stabilities. The general trends realized in these preparations were that, with increasing amine content, amine modified lignin-sulfonated lignin mixtures showed greater package dyeing heat stability. However, by increasing the amine content, the dispersant's viscosity increases at low pH. Since the maximum level of substitution in the aminomethylation of lignin is determined by the $pK_a$ of the amine, selection of an amine with minimal acidity to neutral (e.g., imidazole, $pK_a$~6+ to 7) can provide a substitution level of as much as about 16 wt. % and still maintain the desired viscosity and solubility. Whereas, the maximum substitution with an amine of high $pK_a$ (e.g., dimethylamine, $pK_a$=10) can only provide a level of about 8 wt. %.

The use of amine modified lignin-sulfonated lignin mixtures in dyestuff compositions permits the use of higher sulfonated lignin during milling and general formulation while lowering the solubility at acidic pH for improving the dye bath stability during the high temperature, high shear package dyeing environment. The resulting lower dosage requirement has the potential to make higher strength dye liquids which should translate into added benefits for many dyestuff producers in addition to the environmental benefits resulting from the lower dispersant requirement.

Ideally, the amine needed for a standard disperse dyeing should have a $pK_a$ as low as possible, as typical dyestuff formulations occur at alkaline pH conditions of about 8.0–8.5. At this pH, the amine would not interfere with the solubility of the dispersant mixture. At dyeing conditions of pH about 4.0–5.0, the amine is protonated, which neutralizes a portion, or all, of the negatively charged sulfonic groups and carboxylic acid groups in the respective sulfonated lignin molecules. The extent of charge neutralization is dictated by the number of negatively charged groups in the respective lignin molecules (aminomethylated and sulfonated) of the dispersant mixture and the protonated fraction of the amine groups.

Aminomethylation of Lignin

A 20–25% aqueous solution is prepared by gradual addition of dry lignin (alkali lignin) powder (preferably selected from the group of commercially available lignins including the INDULIN® lignins sold by Westvaco Corporation) to water maintained at 40° C., and the solution pH is adjusted to 10.6 with 50% NaOH. The prepared solution is treated with an amine (preferably selected from the group of secondary amines, including those listed in Table I above) followed by addition of an equimolar amount of formaldehyde, and the combination is then heated at 90° C. for 3–12 hr. The typical molar amounts of amine used per 1000 g of lignin is 2.0.

A commercially available tertiary amine lignin, prepared as set forth herein, is INDULIN W-1, manufactured and marketed by Westvaco Corporation.

Heat Stability Testing

The dispersant to be evaluated is weighed (0.5 g based on solids) into a 100 mL beaker and mixed with 2.0 g of dyestuff to form a "mother paste" (prepared by grinding 15 g of a disperse dye with 5 g of a commercially available grinding agent) and 5 mL of a buffer solution (pH=5.5). For a proper (i.e., fair) comparative evaluation, the mother paste is formed by grinding the disperse dye with the grinding agent to a standard particle size. Then, aliquots are withdrawn from the formed mother paste to which the dispersant is added. This assures that all dispersants are tested under standardized conditions.

The total weight is adjusted to 50 g with deionized (DI) water. The well-stirred mixture's pH is adjusted to between 4.5–5.0 using a 25% solution of acetic acid. The package dyeing process begins by pouring the dye sample into the dye chamber of a laboratory package dyer. The dyeing cycle consists of heating the dye bath from 70° C. to 130° C. at 2 degrees per minute while recording the pressure at a constant flow rate. Temperature versus the differential pressure is recorded during the dyeing cycle. If instability occurs, the pressure increases until the dyestuff solubilizes, after which the pressure decreases to its original level. This represents what is referred to as the "dyeing curve." The area under the curve then is recorded as package dyeing heat stability (bar ° C.). Ideally, the area under the curve should be zero (0). All experimental samples were tested with disperse Orange 30 dye as the primary screening test.

EXAMPLE

A tertiary amine lignin, INDULIN W-1, was mixed with POLYFON O, a sulfonated lignin manufactured and marketed by Westvaco Corporation as, among other applications, a disperse dye dispersant. The mixture was tested for heat stability, and the results were compared against the heat stability of REAX 85A, noted earlier as the industry standard for sulfonated lignin disperse dye dispersants. The results are shown in Table II.

TABLE II

| Sample | Acid Point (g) | Differential Pressure Area (bar ° C.) | Heat Stability of REAX 85A, AP = 2.1 (bar ° C.) |
|---|---|---|---|
| POLYFON O | 3.6 | 27.2 | 19.8 |
| POLYFON O + 0.5 M INDULIN W-1 | 0.1 | 1.5 | 21.9 |
| POLYFON O + 0.75 M INDULIN W-1 | 0.1 | Zero[1] | 21.9 |
| POLYFONO O +1.0 M INDULIN W-1 | 0.1 | Zero[2] | 21.9 |

[1]Very slight instability at beginning of heat stability test.
[2]Larger instability at beginning of heat stability test.

The data show that 0.5 mole of INDULIN W-1 reduced the differential pressure area of POLYFON O with disperse Orange 30 from 27.2 bar ° C. to 1.5 bar ° C. and to zero at 0.75 mole INDULIN W-1 addition level. INDULIN W-1, alone, failed the heat stability test. Larger INDULIN W-1 additions caused some instability during the initial heat-up cycle, but the instability disappeared at the higher temperatures of dyeing.

That which the inventors consider as the subject matter of the invention include:

(1) A dyestuff composition comprising a dyecake comprising a disperse dye and a dispersant, said dispersant comprising a mixture of amine modified lignin and sulfonated lignin;

(2) The dyestuff composition of (1) wherein the disperse dye is a member of the group consisting of azo dyes and anthraquinone dyes;

(3) The dyestuff composition of (2) wherein the azo dyes are selected from the group of C.I. Dispense Color Numbers consisting of Orange 30, Blue 79, and Red 167;

(4) The dyestuff composition of (2) wherein the anthraquinone dyes are selected from the group of C.I. Dispense Color Numbers consisting of Red 60 and Blue 60;

(5) The dyestuff composition of (1) wherein the sulfonated lignin is selected from the group of lignins from the alkali pulping processes which have been subsequently sulfonated and lignosulfonates from the sulfite pulping process;

(6) The dyestuff composition of (5) wherein the sulfonated alkali lignins are selected from sulfonated and sulfomethylated kraft lignins;

(7) The dyestuff composition of (6) wherein the amine a secondary amine;

(8) The dyestuff composition of (7) wherein the amine is selected from the group consisting of dimethylamine, morpholine, imidazole, sarcosine, pyrrolidine, diethylamine, dibutylamine, diethanolamine, diisopropanolamine, and 2-methylimidazole; and (9) The dyestuff composition of (1) wherein the dispersant mixture exhibits an improved activity over a sulfonated lignin alone, permitting a reduced dosage to achieve the same level of activity as the dosage required of the sulfonated lignin alone.

The examples herein are intended to be representative only and not all inclusive of the scope of the subject matter of the disclosed invention. The invention is further set forth and defined in the claims which follow.

What is claimed is:

1. A dyestuff composition comprising a dyecake comprising a disperse dye and a dispersant, said dispersant comprising a mixture of aminoethlylated lignin and a sulfonated lignin.

2. The dyestuff composition of claim 1 wherein the disperse dye is a member of the group consisting of azo dyes and anthraquinone dyes.

3. The dyestuff composition of claim 2 wherein the azo dyes are selected from the group of C.I. Dispense Color Numbers consisting of Orange 30, Blue 79, and Red 167.

4. The dyestuff composition of claim 2 wherein the anthraquinone dyes are selected from the group of C.I. Dispense Color Numbers consisting of Red 60 and Blue 60.

5. The dyestuff composition of claim 1 wherein the sulfonated lignin is selected from the group of lignins from the alkali pulping processes which have been subsequently sulfonated and lignosulfonates from the sulfite pulping process.

6. The dyestuff composition of claim 5 wherein the sulfonated alkali lignins are selected from sulfonated and sulfomethylated kraft lignins.

7. The dyestuff composition of claim 1 wherein the amine modified lignin is prepared by reacting an alkali lignin with an amine in the presence of formaldehyde.

8. The dyestuff composition of claim 7 wherein the amine is a secondary amine.

9. The dyestuff composition of claim 8 wherein the amine is selected from the group consisting of dimethylamine, morpho line, imidazole, sarcosine, pyrrolidine, diethylamine, dibutylamine, diethanolamine, diisopropanolamine, and 2-methylimidazole.

10. The dyestuff composition of claim 1 wherein the dispersant mixture exhibits an improved activity over a sulfonated lignin alone, permitting a reduced dosage to achieve the same level of activity as the dosage required of the sulfonated lignin alone.

* * * * *